(12) United States Patent
O'Connor et al.

(10) Patent No.: US 9,631,327 B2
(45) Date of Patent: Apr. 25, 2017

(54) SEAMING ARTIFICIAL TURF

(75) Inventors: Lawrence Joseph O'Connor, Sarasota, FL (US); Timothy Alan O'Connor, Dalton, GA (US); Frank Keith Bonnell, Ringgold, GA (US); William Mark Bobo, Rocky Face, GA (US)

(73) Assignee: APT ADVANCED POLYMER TECHNOLOGY CORP., Harmony, PA (US)

( * ) Notice: Subject to any disclaimer, the term of this patent is extended or adjusted under 35 U.S.C. 154(b) by 149 days.

(21) Appl. No.: 13/328,107

(22) Filed: Dec. 16, 2011

(65) Prior Publication Data

US 2012/0186729 A1    Jul. 26, 2012

Related U.S. Application Data

(60) Provisional application No. 61/423,917, filed on Dec. 16, 2010, provisional application No. 61/426,354, filed on Dec. 22, 2010, provisional application No. 61/467,230, filed on Mar. 24, 2011.

(51) Int. Cl.
| | |
|---|---|
| *B65H 16/00* | (2006.01) |
| *E01C 13/08* | (2006.01) |
| *E01C 23/00* | (2006.01) |
| *B29C 65/48* | (2006.01) |
| *B29C 65/78* | (2006.01) |

(52) U.S. Cl.
CPC ............ *E01C 13/08* (2013.01); *E01C 23/00* (2013.01); *B29C 65/48* (2013.01); *B29C 65/4815* (2013.01); *B29C 65/7832* (2013.01); *Y10T 156/1097* (2015.01); *Y10T 156/1798* (2015.01)

(58) Field of Classification Search
CPC . B29C 65/48; B29C 65/4815; B29C 65/7832; Y10T 156/1097; Y10T 156/1798
See application file for complete search history.

(56) References Cited

U.S. PATENT DOCUMENTS

| | | | | |
|---|---|---|---|---|
| 2,552,114 | A * | 5/1951 | Reinhard | 428/62 |
| 3,969,564 | A * | 7/1976 | Carder | 428/212 |
| 4,087,309 | A * | 5/1978 | Lang | 156/497 |
| 4,259,142 | A * | 3/1981 | Kortepeter | 156/497 |
| 4,489,115 | A * | 12/1984 | Layman et al. | 428/62 |
| 4,617,208 | A * | 10/1986 | Cadenhead, Sr. | D02G 1/002 156/148 |
| 4,725,328 | A * | 2/1988 | Arnold | 156/380.9 |
| 5,693,171 | A * | 12/1997 | Foster et al. | 156/304.4 |
| 6,431,239 | B1 * | 8/2002 | Massey et al. | 156/497 |
| 6,973,951 | B2 * | 12/2005 | Henegar | 156/499 |

(Continued)

*Primary Examiner* — Mark A Osele
*Assistant Examiner* — Nickolas Harm
(74) *Attorney, Agent, or Firm* — Robinson IP Law, PLLC

(57) ABSTRACT

A method for seaming artificial turf at its edges is provided. In some embodiments, the method includes providing a tape having a lower surface resting on a support surface, an upper surface underlying the edges of the artificial turf, and a hot melt pressure sensitive adhesive provided on the upper surface of the tape. After application of heat sufficient to soften the hot melt pressure sensitive adhesive, the layer of hot melt adhesive is bonded to the lower surface of the edges of the turf to the tape while the adhesive extends into valleys of the underside of the turf. Also provided is a heating cart for heating the adhesive and a method of using the heating cart to heat the adhesive.

24 Claims, 7 Drawing Sheets

(56) References Cited

U.S. PATENT DOCUMENTS

| | | |
|---|---|---|
| 7,189,445 B2 | 3/2007 | Knox |
| 7,347,244 B2 * | 3/2008 | Vaillancourt ................. 156/497 |
| 7,838,096 B2 * | 11/2010 | Hayes et al. .................... 428/62 |
| 2002/0136846 A1 | 9/2002 | Prevost |
| 2004/0234719 A1 | 11/2004 | Jones |
| 2007/0098925 A1 | 5/2007 | Daluise |
| 2009/0169797 A1 | 7/2009 | Hayes, II |

* cited by examiner

US 9,631,327 B2

SEAMING ARTIFICIAL TURF

RELATED APPLICATION DATA

This application claims priority to U.S. Provisional Application Ser. No. 61/423,917 filed on Dec. 16, 2010, U.S. Provisional Application Ser. No. 61/426,354 filed on Dec. 22, 2010 and U.S. Provisional Application Ser. No. 61/467,230 filed on Mar. 24, 2011, the contents of each of which is herein incorporated in its entirety by this reference.

BACKGROUND OF THE INVENTION

Artificial turf is used in a variety of settings, for example, in playing fields. Artificial turf is sometimes laid in strips which are seamed together to create an installation. Artificial turf may be seamed together in various ways, including applying adhesives and/or hand sewing the edges of the strips of turf together.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Generally, according to one non-limiting aspect, disclosed is a method of forming seams in artificial turf comprising providing two strips of artificial turf comprising a backing sheet with an upper surface and a lower surface for resting on the support surface; a plurality of rows of tufts of a filament material arranged to simulate blades of grass with the filament material extending upwardly from the upper surface of the backing sheet, wherein the tufts have base portions defining rows of projecting bumps extending downwardly from the lower surface backing sheet and defining valleys therebetween. Moreover, the method includes laying the two strips of artificial turf edge to edge onto a support surface; providing a base tape having a lower surface for resting on the support surface and an upper surface comprising a layer of adhesive and laying the base tape on the support surface between the edges of the artificial turf fabric. The method further includes heating the adhesive to a point where the layer of adhesive is softened but not completely melted and positioning the edges of the turf strips adjacent to each other on the layer of softened adhesive; and pressing the lower surface of the backing sheet into the softened adhesive.

BRIEF DESCRIPTION OF THE DRAWINGS

Illustrative embodiments of the invention are described in detail below with reference to the following drawing figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
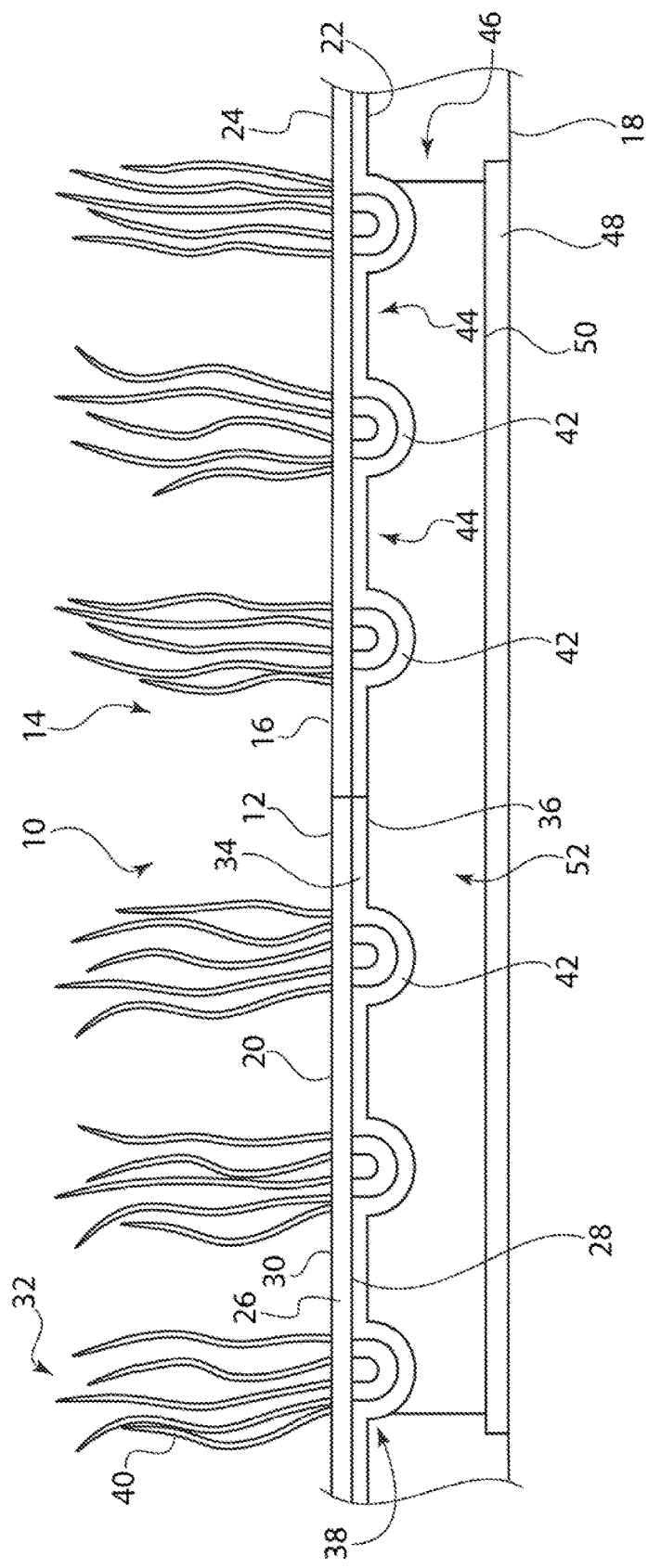
FIG. 1 is a cross-sectional view through a seam between two strips of artificial turf according to one embodiment.

Referring now to the drawings for a better understanding of the invention, FIG. 1 is a cross-sectional view through the seam of two strips of artificial turf 10, 14. Artificial turf strips 10, 14 each include a backing sheet 20. Backing sheet 20 includes a first layer 26 of material through which a plurality of rows 38 of tufts 32 of fibers may be sewn, tufted or knit. The tufts 32 are formed of a filament material 40 which, when sewn into the first layer 26 of the backing sheet 20, resembles a blade of grass extending upwards from the upper surface 24 of backing sheet 20 (the upper surface 24 corresponds to the upper surface 30 of the first layer 26). The plurality of rows 38 of tufts 32 create projecting bumps 42 that extend downwardly from the lower surface 28 of first layer 26 of the backing sheet 20 to define bumps 42 and valleys 44. The backing sheet 20 also includes a second layer of material 34 that secures the bumps 42 of the plurality of rows 38 of tufts 32 to the lower surface 28 of first layer 26. The lower surface 36 of second layer 34 corresponds to the lower surface 22 of the backing sheet 20. The first layer 26 may be a primary backing made from woven polypropylene or any other suitable material, and the second layer 34 may be formed from polyurethane, although any suitable material or combination of materials may be used to form first and second layers 26, 34. The backing sheet 20 may include additional layers of material.

Figure 2:
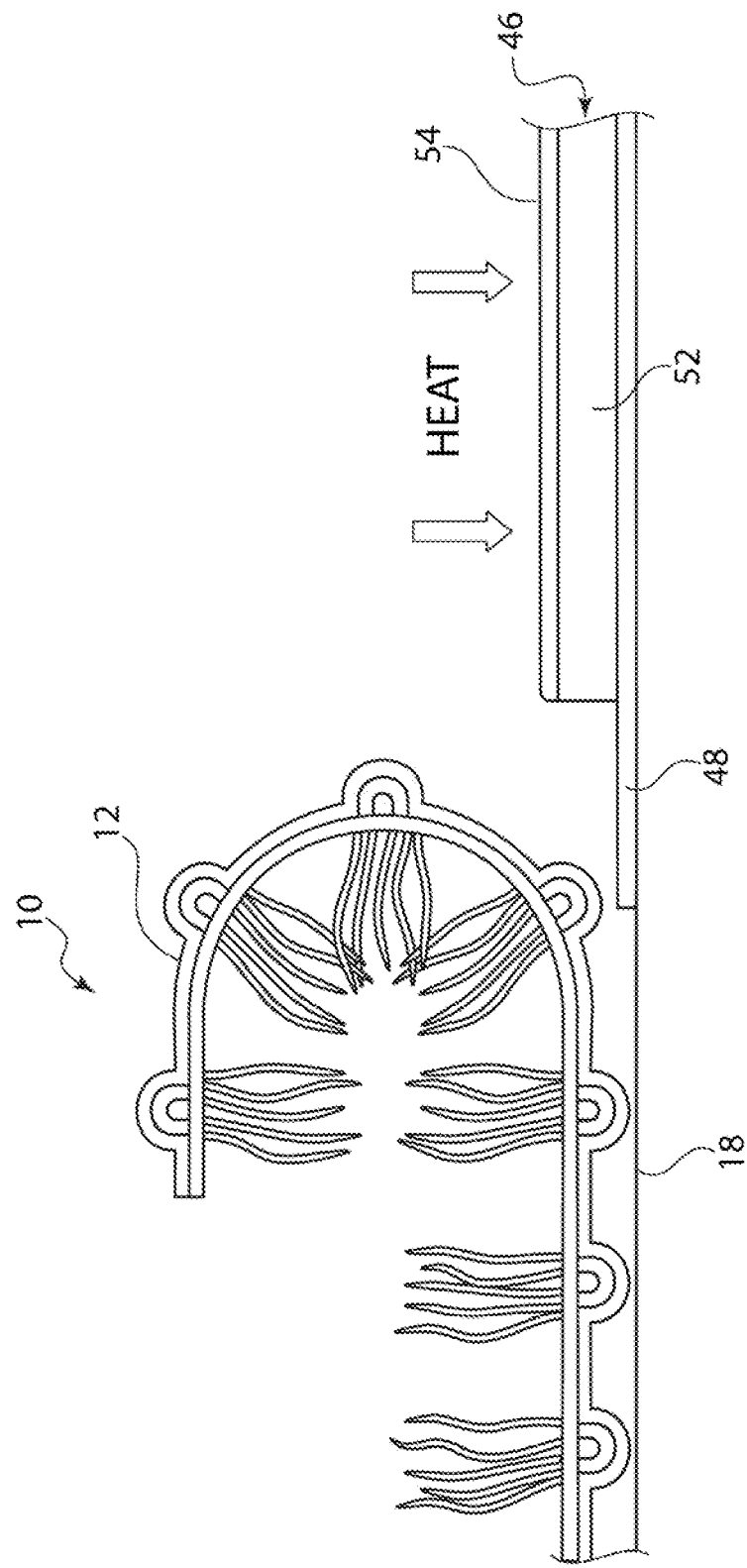
FIG. 2 is a cross-sectional view through the seam of FIG. 1 showing a first step in a method according to one embodiment.

To join together the artificial turf strips 10, 14, in one embodiment the strips are laid edge to edge so that the lower surface 22 of the backing sheet 20 lays on top of a support surface 18, such as the ground. The support surface 18 may include holes or aggregate, allowing for drainage of water (not pictured in FIG. 1). It may be desirable to include other materials between the support surface 18 and the strips of artificial turf 10, 14, such as a layer of cushioning. The artificial turf strips 10, 14 are then adjusted as needed so that edges 12 and 16, contact one another without overlapping or gapping. It may be necessary to cut or trim the edges 12 and 16 to obtain proper alignment. As shown in FIGS. 1 and 2, the turf edges 12 and 16 are then folded back and away from one another to expose the support surface 18. Optionally, a center line designating the line where the turf edges 12 and 16 meet may be marked using a material such as chalk or other similar marking method. As shown in FIG. 2, a base tape 46 is positioned between turf edges 12 and 16 such that the lower surface 48 of base tape 46 rests on top of the support surface 18 along the length of turf edges 12 and 16 and along the optional center line. The lower surface 48 of base tape 46 is sometimes referred to as a substrate. A layer of pressure sensitive hot melt adhesive 52 in cold form is provided on the upper surface 50 of base tape 46. Examples of pressure sensitive hot melt adhesives that may be used include the adhesive 2622 manufactured by DHM Adhesives of Calhoun, Ga. or the adhesives 2755 and LV502021821 manufactured by Bostik Findly of Wawatosa, Wis., although any suitable pressure sensitive hot melt adhesive may be used. The center of the base tape 46 may also be marked with a visible line. For example, a filament may be embedded in the adhesive layer 52 to aid in the placement of the base tape 46 along the optional center line between turf edges 12, 16. The base tape 46 may be laid along the length of turf edges 12 and 16 in a single strip or in multiple strips.

Once the base tape 46 is positioned along the optional center line, the base tape 46 is held in place by staking with steel spikes. In one example, the lower surface 48 of base tape 46 has a width slightly larger than the layer of adhesive 52 located on the upper surface 50 of base tape 46 to protect the support surface 18 from exposure to heat during seaming. As shown in FIG. 2, release sheet 54 is provided on top of the layer of adhesive 52 to protect the adhesive from contamination during the placement of the base tape 46 and during transport from the factory where the base tape is formed. Other types of adhesive may be used, such as a non-pressure sensitive hot melt adhesive.

The lower surface 48 of base tape 46 may be formed of a polymer layer such as a non-woven or woven fibrous material. Non-woven materials include, for example, spunbonded polyester, although other suitable materials may be used. Woven materials provide dimensional stability under tension and are less prone to buckling or puckering in use. Where woven materials are used, a backing layer such as urethane, latex or other suitable coating material may be provided to prevent the adhesive 52 from penetrating through the lower surface 48 of base tape 46. For example, a base tape 46 having a lower surface 48 formed from woven polyester or polypropylene with a coating of urethane on the underside of lower surface 48 may be used. Providing a coating on the underside of the lower surface 48 also helps prevent the woven fibers from distorting under tension or under the application of heat. If the support surface 18 is susceptible to heat damage or if there are additional layers between the support surface and the artificial turf panels 10, 14 that are susceptible to damage from exposure to high temperatures, such as with layers made of rubber, the lower surface 48 of base tape 46 may be made of a woven fibrous material, which is resistant to heat. As shown in FIG. 2, the lower surface 48 of the base tape 46 may have a width greater than the base tape's 46 layer of adhesive 52 so that the edges of the lower surface 48 of base tape 46 extend beyond the adhesive layer 52 to prevent the support surface 18, or other intermediary layers, from being damaged by heat during seaming. Other non-limiting examples of suitable woven materials for base tape 46 include polyester, woven glass or other heat resistant materials such as Kapton® and Nomex® manufactured by DuPont™.

In some embodiments, once the base tape 46 has been properly aligned with respect to the strips 10, 14, but prior to removing the release sheet 54, the edges 12 and 16 are folded down to confirm that the edges properly lie along the center of the base tape 46 without any overlapping or gapping where the edges 12, 16 meet. The alignment of the edges 12, 16 may be checked by referencing the placement of the edges relative to the optional filament in the adhesive layer 52 that marks the center of the base tape 46. The edges 12, 16 may be further trimmed to aid in proper alignment. The edges 12, 16 are then folded back against their respective turf slips (as shown in FIG. 2) to expose the layer of adhesive 52 and the release sheet 54 thereon.

With the turf edges 12, 16 pulled back as shown in FIG. 2, the release sheet 54 is removed to expose the layer of adhesive 52. In some embodiments, the layer of adhesive 52 is between about 0.06 inches and about 0.1 inches thick and in some examples may span between about 4.5 inches and about 5.0 inches in width. At room temperature, a typical pressure sensitive hot melt adhesive layer is stiff and resists permanent engagement of the adhesive into the valleys 44 defined by the rows 38 of bumps 42 of the turf strips 10, 14. The application of heat to pressure sensitive hot melt adhesive acts to increase the tack of the adhesive. The increase in tack allows the adhesive 52 to engage the lower surface 22 of the backing sheet 20 with a high tack value so that the backing sheet 20 cannot pull away from the layer of adhesive 52 of the base tape 46.

The desired thickness of the layer of adhesive 52 depends on the characteristics of the turf to be seamed, including the depth of the valleys 44 between the rows 38 of tufts 32. In some examples, the layer of adhesive 52 contains enough volume of adhesive to fill all the valleys 44 and cover the bumps 42 of tufts 32 when softened and pressed into the lower surface 22 of backing sheet 20. For example, the amount of adhesive provided on the base tape 46 for a 160 foot seam may range from about 10 lbs to about 80 lbs depending on the width and depth of the valleys 44 and bumps 42 of the particular turf used. In one example, 40 lbs of hot melt adhesive may be provided on the upper surface 48 of base tape 46 for seaming a 160 foot seam. The amount of adhesive required will vary depending on the depths of the valleys 44 created by the bumps 42.

With the turf edges 12, 16 folded back as shown in FIG. 2 and the release sheet 54 removed, the layer of adhesive 52 is exposed for heating by a heating system, such as the heat cart 100 shown in FIGS. 2-7, although any suitable heating system may be used, such as a heat gun.

In some embodiments, the viscosity of the adhesive is adjusted to alter the softening point of the adhesive, for example an adhesive with a higher viscosity is used to raise the softening temperature. The temperature to which the adhesive needs to be heated will depend both on the type of turf used and the viscosity of the hot melt adhesives. In some embodiments, the layer of adhesive 52 is heated so that it is not fully melted but instead is sufficiently softened so that it extends into the valleys 44 between rows 38 of bumps 42 and conforms to the shape of the underside of the turf. When the layer of adhesive 52 is completely melted it may run off the base tape 46 and may lack sufficient stiffness to fill the valleys 44. Substantially filling the valleys 44 with the adhesive 52 reduces the possibility of contamination of bonding to the seam area. Such contamination may be caused by penetration of elements such as water. In some embodiments, the lower surface 48 of base tape 46 is substantially incompressible such that the engagement of the adhesive 52 into the valleys 44 is formed by pressing the softened heated adhesive 52 into the valleys 44. By not fully melting the layer of adhesive 52 it is less likely that the adhesive will extend beyond the lower surface 48 of the base tape 46 or be forced upwards at the seam where it may contact the filaments 40 of turf. In some embodiments, the viscosity of the adhesive is adjusted to alter the softening point of the adhesive. Pressure sensitive hot melt adhesive allows the seam edge to remain pliable, allowing it to accommodate forces applied during use without tearing. The high tack connection that is created between the layer of adhesive 52 and lower surface 22 of the backing sheet 20 prevents the adhesive from breaking or pulling away from the lower surface 22 of the backing sheet 20 during use.

In some embodiments, heat is applied to the layer of adhesive 52 via a heat cart 100, which is shown in FIGS. 3-7. The heat cart 100 shown in FIGS. 3-7 includes a row of gas fired heated plates or radiant heat elements 102, 104, 106, 108 that are used to apply heat to the exposed adhesive layer 52, though more or fewer radiant heat elements may be used. In other embodiments, the heat cart 100 applies heat to the layer of adhesive 52 using means other than radiant heat elements.

In embodiments where the heat cart 100 is used, the turf edges are turned down on the heated adhesive layer to create the seam at about 5 to about 6 feet behind the heat cart 100. Thus, the cooling effect of the ambient temperature should be taken into effect when determining to what temperature to heat the adhesive 52. For example, in one example of seaming using the heat cart 100 in an application having an ambient temperature of between about 70 degrees Fahrenheit and about 80 degrees Fahrenheit and a seam of approximately 160 feet, the pressure sensitive hot melt adhesive (such as the adhesive 2622 manufactured by DHM Adhesives of Calhoun, Ga.) is heated by the heat cart 100 to a surface temperature of about 380 degrees Fahrenheit to about 400 degrees Fahrenheit. Due to the ambient temperature, the surface temperature of the adhesive at the location where the seam is formed, about 5 to about 6 feet behind the heat cart, is about 225 degrees Fahrenheit to about 265 degrees Fahrenheit.

Figure 3:
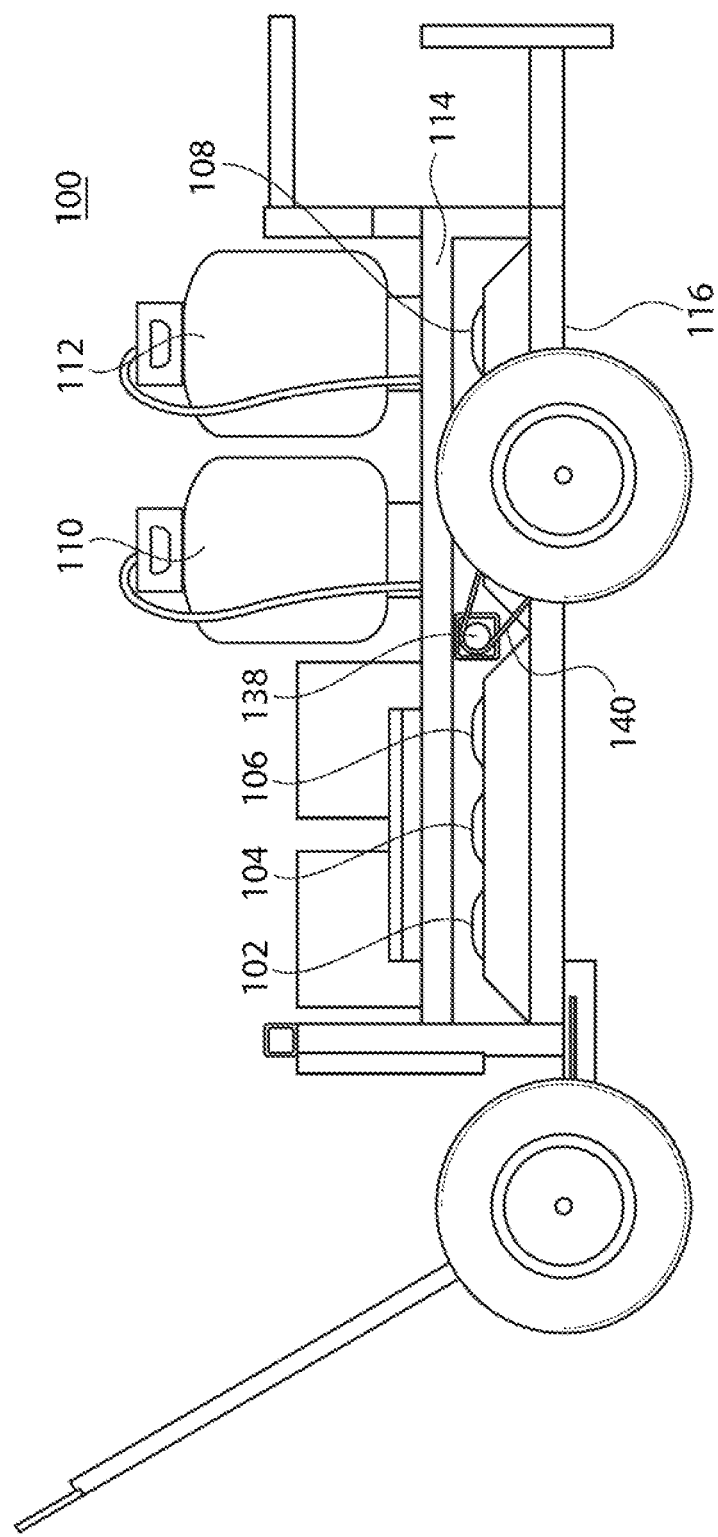
FIG. 3 is a side view of a heat cart according to one embodiment.
Figure 4:
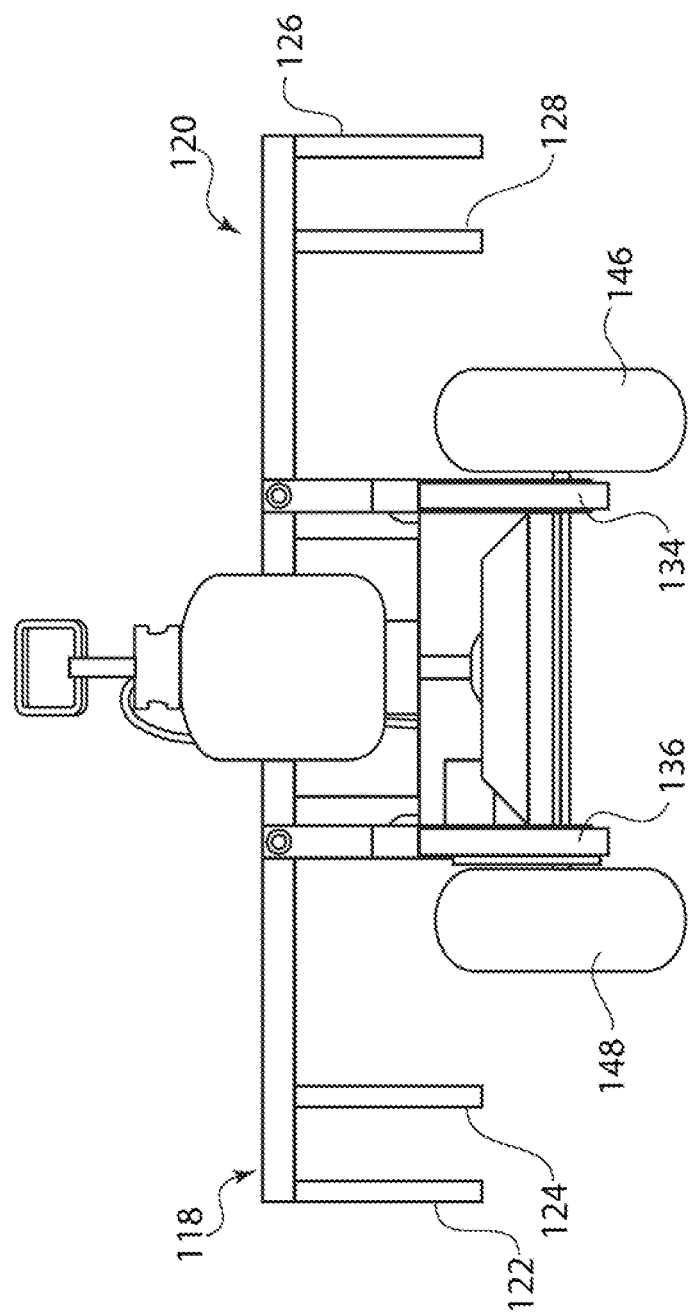
FIG. 4 is a rear view of the cart of FIG. 3.
Figure 6:
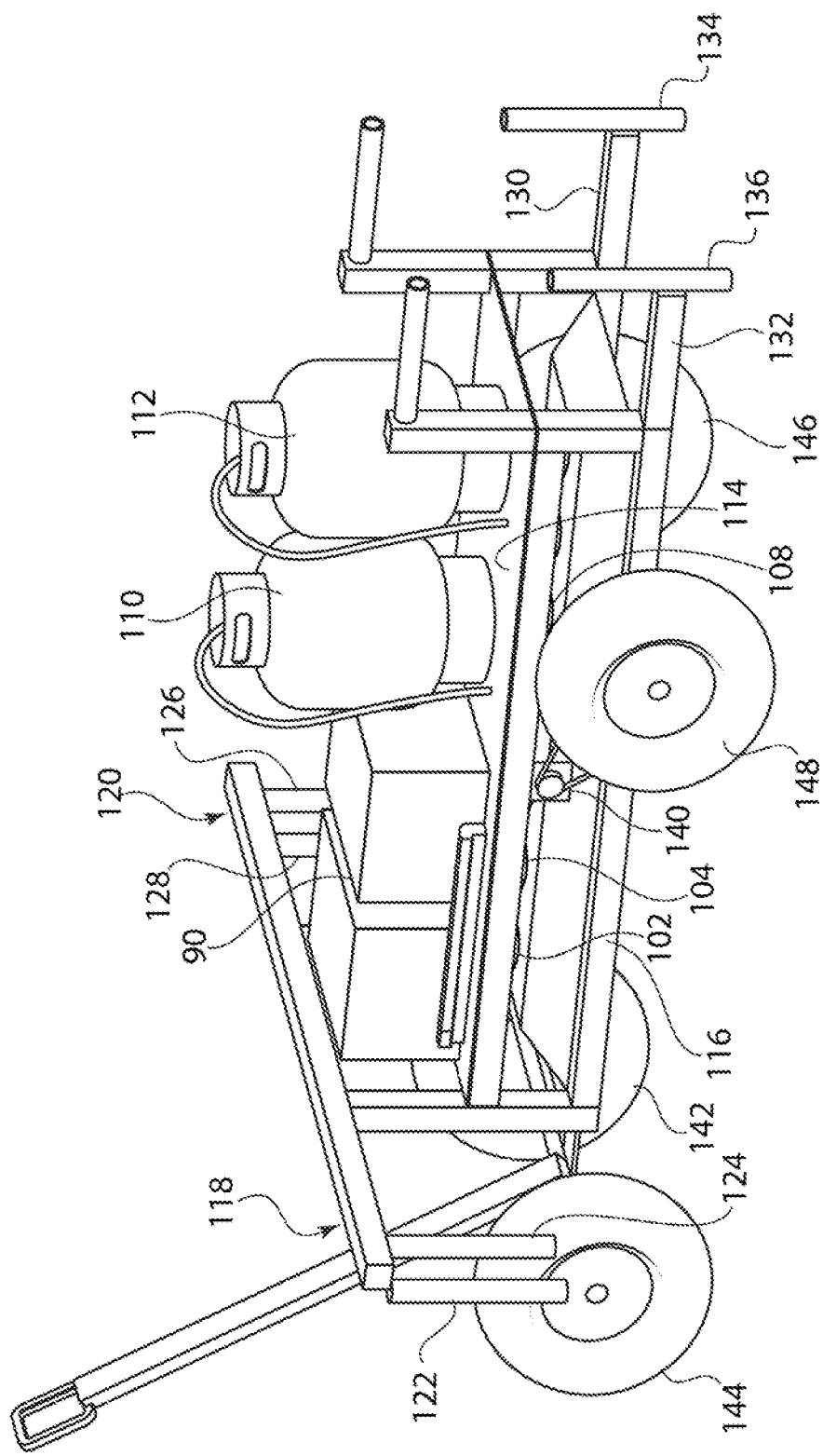
FIG. 6 is a perspective view of the cart of FIG. 3.

As shown in FIGS. 3 and 6, the radiant heat elements 102, 104, 106, 108 are located on the bottom frame section 116 of the heat cart 100 and are maintained at a desired height (in some embodiments, approximately 3 inches) above the base tape 46 and its layer of adhesive 52 during the application of heat. In the illustrated embodiment, the radiant heat elements 102, 104, 106, 108 are heated by gas from propane tanks 110 and 112 on the upper frame 114 of the heat cart 100. As shown in FIG. 3, the heat cart 100 is driven by a motor 138 driving ground wheels 142, 144, 146, 148 supporting the cart by a drive system 140.

Figure 5:
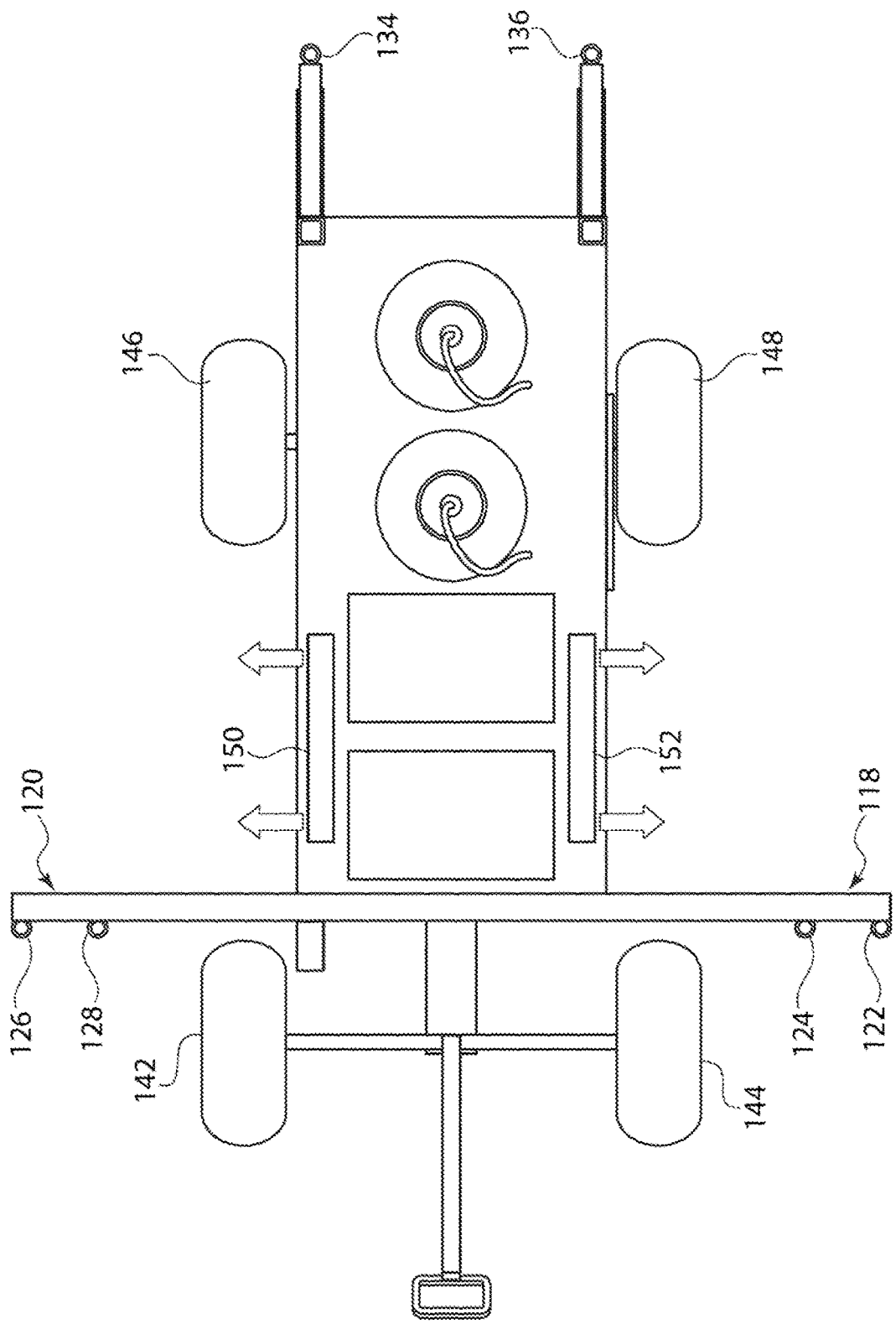
FIG. 5 is a top plan view of the cart of FIG. 3.
Figure 7:
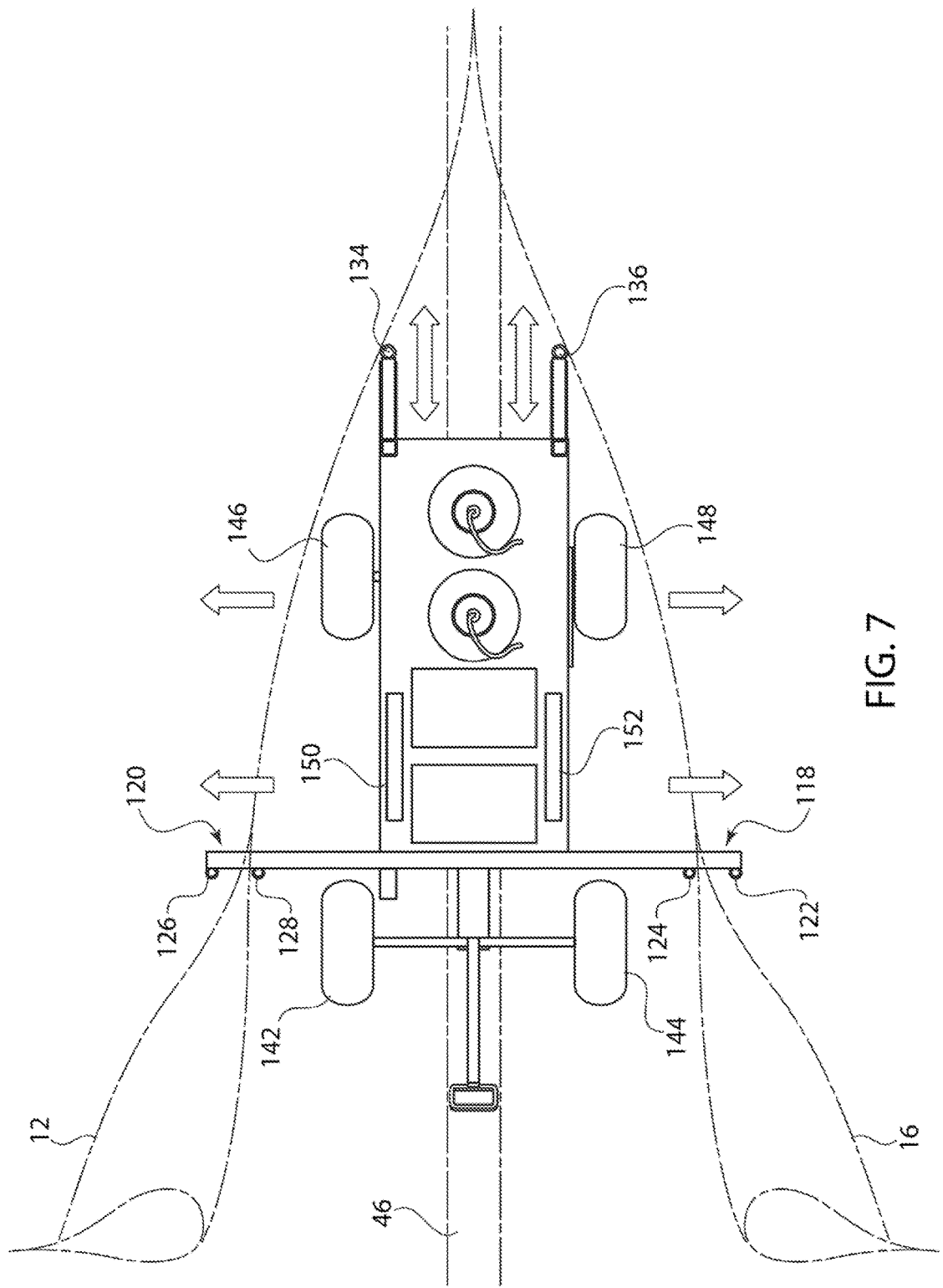
FIG. 7 is a top plan view of the cart of FIG. 3, shown as it interacts with artificial turf strips.

As shown in FIGS. 4-7, the heat cart 100 has front guide members 118 and 120 that extend from each side of the cart outboard of the front wheels 142 and 144. Each of the guide members 118 and 120 includes a pair of hanging parallel vertical rollers 122, 124 and 126, 128 attached at a top end to the respective guide member. Vertical rollers 122, 124, 126, 128 engage and lift the respective turf edges away from the heat cart 100 as the heat cart passes. As shown in FIGS. 5-7, the heat cart 100 also includes rear guide members 130 and 132, each of which include a vertical roller, 134 and 136. Vertical rollers 134 and 136 support the respective turf edges as the turf edges fall back towards the heated adhesive layer 52 (shown in FIG. 7). The rear guide members 130 and 132 and vertical rollers 134 and 136 are located inboard of the rear wheels 146 and 148. The rear vertical rollers 134 and 136 also prevent the bottom side of the turf from making contact with the frame of the cart, which is hot. As shown in FIGS. 5 and 7, the heating cart 100 may also include blowers 150 and 152 that aid in drying turf edges 12 and 16 by blowing the heated air from radiant heat elements 102, 104, 106, 108 onto the turf edges 12 and 16. Blowers 150 and 152 may be secured to opposite sides of the cart between the front guide members 118, 120 and rear wheels 146, 148.

FIG. 7 is a top plan view of the cart of FIG. 3. In one embodiment, prior to the passage of the heat cart 100, the turf edges 12 and are turned back from the base tape 46. With the turf edges 12 and 116 pulled away, the release sheet 54 is removed. The heat cart 100 is aligned with the front wheels 142, 144 spaced approximately equidistant from the center of the base tape 46. In this manner, the radiant heating elements 102, 104, 106, 108 are directly above the adhesive layer 52 of the base tape 46. Similarly, the rear wheels 146, 148 are positioned so that they straddle the center of the base tape 46. In some embodiments the heat cart may include front and/or rear handles for positioning and aligning the heat cart over the turf edges.

As the cart moves the turf edges 12 and 16 are engaged by the front vertical rollers 122, 124 and 126, 128 respectively, as depicted in FIG. 7. Front vertical rollers 124 and 126 lift the turf edge 12 so that the turf edge 12 is held up and away from the heat source and heat cart 100 as the heat cart 100 passes. Vertical rollers 126 and 128 likewise lift the turf edge 16 so that turf edge 16 is held up and away from the heat source and heat cart 100 as the heat cart 100 passes. As the blowers 150, 152 pass the lifted turf edges 12, 16, the blowers blow the heated air rising from the radiant heat elements 102, 104, 106, 108 onto the turf edges 12 and 16. The blown heated air aids in drying the turf edges 12 and 16 prior to placement on the heated layer of adhesive 52.

As the heat cart 100 passes over the base tape 46, the layer of adhesive 52 is heated by radiant heating elements 102, 104, 106, 108 located directly above the base tape 46. The layer of adhesive 52 is heated to the desired temperature based on the type of adhesive being used, the amount of adhesive in the layer, the type of turf to be seamed, and the ambient temperature. Heat of as much as 85,000 BTU may be required to sufficiently heat a layer of adhesive 52 that is approximately 100 mils thick to a surface to a temperature of approximately 250 degrees Fahrenheit, such level of heat being generated using gas fired heaters to heat the radiant heat elements 102, 104, 106, 108, though other suitable heat generating means could be used. In one embodiment, the drive speed of the cart is about 15 feet per minute but may be adjusted to control the temperature to which the adhesive layer 52 is heated. For example, in colder weather, the speed of the cart may be slowed to expose the seam to heat for longer to ensure that the temperature of the seam gets to the desired level. The vertical rollers 134, 136 on rear guide members 130, 132 support the turf edges 12, 16 away from the heat cart 100 as the heat cart 100 passes and guides the edges 12, 16 as they fall back towards the heated adhesive layer 52.

The filaments 40 (not shown in FIG. 7) of the tufts 38 (not shown in FIG. 7) on the turf edges 12, 16 may lie in a direction so that, on one edge of turf, the filaments 40 fall away from the seam edge and, on the other edge of the turf, the filaments 40 fall in toward the seam edge. By placing the turf edge with its filaments falling away from the seam onto the heated layer of adhesive 52 first, the heated layer of adhesive 52 remains exposed, unblocked by overhanging filaments, for receiving the second edge of turf whose filaments 40 then fall in towards the seam edge. The rear guide rollers 134, 136 can be adjusted forwardly or rearwardly while the rollers remain substantially vertical and parallel. By placing one of the rollers closer to the cart than the other, the forwardly located roller guides its edge to fall back towards the adhesive layer 52 before the other turf edge. Adjustment of the rollers 134, 136 allows one or the other to be selected as the advanced roller, depending on which turf edge should be laid onto the heated adhesive layer 52 first.

In some embodiments, the turf edges 12, 16 return to their laid flat position about 5 feet to about 6 feet behind the heat cart 100. As the turf edges return to their laid flat position, a seaming operator manually locates the turf edges 12, 16 and adjust them as necessary to ensure that there are no creases or inaccuracies where the turf edges 12, 16 meet as they are positioned on the softened adhesive layer 52.

In some embodiments, after the seaming operator positions the edges of turf onto the softened adhesive layer 52, an optional roller or bar with tines or fingers passes over the seam to provide additional pressure to aid in the bonding of the adhesive to the lower surface 22 of backing sheet 20. In some embodiments, the roller is operated by hand and is rolled back and forth over the seam. The use of a relativity light weight roller and/or a roller with tines, such as a Garden Weasel® or similar device, adds additional pressure to the adhesive to force the adhesive into the valleys 44 without distorting the shape of the valleys 44 and without causing the adhesive to push up through the seam and onto the tufts 32. The amount of pressure applied by the optional roller varies depending on, among other things, the viscosity of the adhesive and the temperature to which it has been heated. In some embodiments, the optional roller or bar is applied over a relatively small area of the seam at a time so that sufficient contact between the backing and the adhesive is achieved. Once the adhesive has cooled and is not as viscous, more pressure may be optionally applied to ensure the bonding of the adhesive to the backing sheet 20. In other embodiments, optional rollers are not used at all.

The system described above allows a seam to be made more efficiently in various conditions, including colder weather. For example, the adjustability of the speed of the cart allows the adhesive to be heated to the desired temperature in various conditions.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The invention claimed is:

1. A method of forming seams in artificial turf comprising:
   (a) providing two strips of artificial turf each comprising:
      (i) a backing sheet having a first layer including an upper surface and a lower surface;
      (ii) a plurality of rows of tufts of a filament material arranged to simulate blades of grass with the filament material extending upwardly from the upper surface of the first layer of the backing sheet, wherein the tufts have base portions defining rows of projecting bumps extending through and downwardly from the lower surface of the first layer of the backing sheet and defining valleys therebetween; and
      (iii) a second backing layer having an upper surface and a lower surface for resting on a support surface, the second backing layer formed on the lower surface of the first layer for securing the projecting bumps to the first layer, wherein the second backing layer conforms to the first layer and projecting bumps such that the projecting bumps and valleys are defined in the lower surface of the second backing layer;
   (b) laying the two strips of artificial turf edge to edge on the support surface;
   (c) providing a base tape having a lower surface for resting on the support surface and an upper surface comprising a layer of adhesive;
   (d) laying the base tape on the support surface between the edges of the artificial turf;
   (e) heating the adhesive to a point where the layer of adhesive is softened but not completely melted;
   (f) positioning the edges of the turf strips adjacent to each other on the layers of softened adhesive; and
   (g) pressing the lower surface of the second layer of the backing sheet into the softened adhesive.

2. The method according to claim 1 wherein the step of providing a layer of adhesive on the tape further comprises providing a sufficient amount of adhesive to substantially fill the valleys.

3. The method according to claim 2 wherein the step of providing a base tape comprises providing a base tape having a lower surface that is substantially incompressible such that the engagement of the adhesive into the valleys is formed by pressing the softened heated adhesive into the valleys.

4. The method according to claim 1 wherein the step of providing a base tape comprises providing a hot melt pressure sensitive adhesive as the upper surface of the base tape.

5. The method according to claim 1 wherein the step of providing a base tape comprises providing on the upper layer of the base tape a layer of adhesive in cold form and a release sheet thereon.

6. The method according to claim 5 further comprising removing the release sheet prior to the laying of the edges of the strips of turf.

7. The method according to claim 6 further comprising rolling back the edges of the turf strips away from the release sheet before the release sheet is removed.

8. The method according to claim 1 wherein the step of providing a base tape comprises providing a base tape having a lower surface comprising a non-woven fibrous material.

9. The method according to claim 1 wherein the step of providing a base tape comprises providing a base tape having a lower surface comprising a woven fibrous material.

10. The method according to claim 9 wherein the step of providing a base tape having a lower surface comprises a woven fibrous material comprises woven glass.

11. The method according to claim 1 wherein the step of providing a base tape comprises providing a base tape having a lower surface comprising a polymeric material.

12. The method according to claim 1 further comprising heating the adhesive prior to the laying of edges of the strips of turf.

13. The method according to claim 1 further comprising providing an adhesive having an upper and a lower surface and heading the adhesive until the upper layer is softened.

14. The method according to claim 1 further comprising heating the adhesive using a heater carried on a cart.

15. The method according to claim 1 wherein the step of providing a base tape further comprises providing a base tape having an upper surface comprising an adhesive having a thickness of at least approximately 0.050 inches.

16. The method according to claim 1 wherein the step of positioning the edges of the turf strips adjacent to one another further comprises checking the alignment of the edges of the turf strips by comparing a distance of the edges of the turf strips relative to a filament running through a center line of the adhesive layer.

17. The method according to claim 1 further comprising rolling back the edges of the turf strips before the base tape is laid on the support surface between the edges of the turf strips.

18. A method of seaming artificial turf comprising:
(a) laying two strips of artificial turf edge to edge on a support surface;
(b) laying between the support surface and the artificial turf strips a base tape comprising a lower surface and an upper surface comprising a layer of hot melt adhesive; and
(c) passing a heat cart over the base tape to heat the hot melt adhesive until it is softened but not melted, wherein the heat cart comprises:
(i) a frame;
(ii) a heat source that warms a heating element;
(iii) a pair of front wheels and a pair of rear wheels; and
(iv) a pair of front guide members, each extending from sides of the cart and including a first roller;
(d) using the first roller to engage and lift the turf edges away from the hot melt pressure sensitive adhesive and the heat source of the heat cart as the heat cart passes over a portion of the base tape.

19. The method of claim 18 wherein the step of laying the base tape on the support surface further comprises laying a base tape having upper surface comprising a layer of hot melt pressure sensitive adhesive.

20. The method of claim 18 wherein the setup of passing the heat cart over the base tape comprises passing a heat cart comprising a heat source that is propane.

21. The method of claim 18 wherein the step of passing the heat cart over the base tape comprises passing a heat cart comprising a heating element that heats the layer of hot melt adhesive.

22. The method of claim 18, wherein the step of passing a heat cart over the base tape further comprises using a second pair of rollers to support the edges of each of the artificial turf strips as the edges fall back towards the support surface as the heating cart passes over the portion of the base tape.

23. The method of claim 18, wherein the step of passing a heat cart over the base tape further comprises adjusting the speed of the heat cart to heat the layer of adhesive to a desired temperature.

24. The method of claim 18, further comprising passing a roller over the edges of the artificial turf strips to apply pressure to facilitate contact between the two artificial turf strips and the layer of adhesive.

* * * * *